United States Patent
Yamamoto (12) 
(10) Patent No.: US 6,274,283 B1
(45) Date of Patent: Aug. 14, 2001

(54) IMAGE PROCESSING METHOD AND IMAGE PROCESSING DEVICE

(75) Inventor: Hiroyasu Yamamoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/584,844

(22) Filed: Jun. 1, 2000

(30) Foreign Application Priority Data

Jun. 2, 1999 (JP) .................................................. 11-154537

(51) Int. Cl.[7] ...................................................... G03C 5/02
(52) U.S. Cl. ............................................. 430/30; 430/401
(58) Field of Search ....................................... 430/30, 401

(56) References Cited

U.S. PATENT DOCUMENTS

| | | | |
|---|---|---|---|
| 5,886,774 | * 3/1999 | Nishida et al. | ........................ 355/40 |
| 5,907,391 | * 5/1999 | Kobayashi et al. | ..................... 355/40 |

* cited by examiner

*Primary Examiner*—Hoa Van Le
(74) *Attorney, Agent, or Firm*—Sughrue, Mion, Zinn, Macpeak & Seas, PLLC (57) ABSTRACT

An image processing method and image processing device are provided which can always carry out optimal image processing without being affected by differences due to developing or differences due to the passage of time. Photographic film characteristics and data of a standard exposure portion, which is recorded outside of image forming regions and read by prescanning or fine scanning, are outputted to a photographic film characteristics storing section. A determination is made as to whether photographic film characteristics of a photographic film whose ID is read are stored in the photographic film characteristics storing section. If the photographic film characteristics are stored, various types of image processings are carried out on the basis of the photographic film characteristics. If the photographic film characteristics are not stored, various types of image processings are carried out after photographic film characteristics are computed from the data of the standard exposure portion.

13 Claims, 7 Drawing Sheets

FILM CHARACTERISTIC CURVES

IMAGE PROCESSING METHOD AND IMAGE PROCESSING DEVICE

BACKGROUND OF THE INVENTION

1. Field of the Invention

The present invention relates to an image processing method and an image processing device in which an image recorded on a photographic photosensitive material is read and image processing is carried out on the image data obtained by reading.

2. Description of the Related Art

Conventionally, digital laboratory systems have been proposed in which an image recorded on a photographic photosensitive material (hereinafter simply referred to as "photographic film") such as a photographic film is read photoelectrically, various types of image processing are carried out on the image data obtained by reading, laser light is modulated on the basis of the image-processed image data, a photosensitive material such as a color paper is scanned and exposed, and a finished print is formed.

In this digital laboratory system, images recorded on photographic films having different photographic film characteristics (exposure amount-color forming density characteristics) are read. In order to obtain a proper image corresponding to the characteristics of the photographic film and the device which outputs the image, various types of corrections must be carried out by effecting image processing. (Examples of correction are gray gradation balance correction for correcting the balance of the three colors of R, G, B of the gray gradation in a normal exposure region, and photographic film non-linearity correction for correcting the non-linear portion in an underexposure region or overexposure region in a photographic film characteristic).

In the conventional digital laboratory system, various methods are employed for correcting the photographic film characteristics and determining the proper image processing conditions. For example, there is a method of carrying out image processing in which image processing conditions are determined from image data of a single image. In another method of carrying out image processing, the photographic film characteristics are estimated from image data of a plurality of images recorded on a single photographic film, and the image processing conditions are determined. In yet another method of carrying out image processing, the photographic film characteristics are estimated from image data of a large number of images recorded on plural photographic films of the same film type, and the image processing conditions are determined.

However, in the above-described conventionally-proposed image processings, in the method of determining image processing conditions from image data of a single image, the image processing conditions are very dependent on the photographed scene, and there is the possibly that density failure or color failure will occur. Further, the method in which the image processing conditions are determined from image data of one film is more accurate since there is a larger number of data, but the image processing conditions are still dependent on the photographed scenes. In the method in which the image processing conditions are determined from image data of plural films of the same film type, the image processing conditions are not dependent on the photographed scenes since there is such a large amount of data. However, photographic films, which have different photographic film characteristics due to different periods of time having passed since manufacturing of the film or development of the film or due to differences in development caused by different developing conditions, are treated as having the same characteristics. Thus, correction cannot be carried out which reflects the differences between the respective photographic films. Further, even in a method in which the photographic film characteristics themselves are stored and used in correction, correction cannot be carried out which reflects the aforementioned differences due to development and differences due to the passage of time.

Further, when reprinting is to be carried out (e.g., when additional prints are to be printed), there is the possibility that processing will be carried out under image processing conditions which are different than those at the time the initial prints were formed (e.g., at the time of simultaneous printing). Thus, the finished images will greatly differ between the prints formed initially and the prints formed at the time of reprinting.

SUMMARY OF THE INVENTION

In view of the aforementioned, an object of the present invention is to overcome the above drawbacks, and to provide an image processing method and an image processing device in which appropriate image processing can always be carried out without being affected by differences due to developing or differences due to the passage of time.

In order to achieve the above object, a first aspect of the present invention is an image processing method comprising the steps of: exposing a predetermined region of a photographic photosensitive material at a predetermined exposure amount; reading the predetermined region of the photographic photosensitive material after the photographic photosensitive material has been developed; on the basis of read data obtained by the step of reading, determining a processing condition for image processing for converting, in accordance with a characteristic of the photographic photosensitive material, image data obtained by reading an image recorded in an image recording region of the photographic photosensitive material; and storing the determined processing condition together with a photographic photosensitive material ID which is applied to the photographic photosensitive material.

In accordance with the first aspect, a predetermined region of a photographic photosensitive material such as a photographic film is exposed at a predetermined exposure amount and developed. The predetermined region is read. On the basis of the read data obtained by reading (e.g., data expressing the density of the predetermined region), a processing condition for image processing for converting, in accordance with a characteristic of the photographic photosensitive material, the image data obtained by reading the image recorded in the image recording region, is determined. (The image processing may be, for example, image processing for converting, in accordance with a characteristic of the photographic photosensitive material, gradation of the image expressed by the image data, such as gray gradation balance correction for correcting the balance of the three colors of R, G, B of the gray gradation in a normal exposure region of the image, or non-linearity correction of the photographic photosensitive material for correcting the non-linear portions in the characteristic of the photographic photosensitive material (the exposure amount-color formed density characteristic)).

The density after development of the predetermined region exposed at the predetermined amount of exposure is a value in which are reflected variations in the characteristic (exposure amount-color formed density characteristic) of the photographic photosensitive material which accompany variations over time or variations in the developing conditions of the photographic photosensitive material. Therefore, on the basis of the read data, the actual characteristic of the photographic photosensitive material can be estimated with higher accuracy from the density of the predetermined region determined from the exposure amount onto the predetermined region (the predetermined exposure amount) and the read data. In the first aspect of the present invention, the processing condition of the image processing for converting the image data in accordance with the characteristic of the photographic photosensitive material is determined on the basis of the read data. Thus, variations in the characteristic of the photographic photosensitive material are reflected in the processing condition, and processing conditions can be obtained which always enable appropriate image processing without being affected by the type of the photographic photosensitive material, or changes over time, or the developing conditions.

In the first aspect of the present invention, the processing condition of the image processing is stored together with the photographic photosensitive material ID which is applied to the photographic photosensitive material. Examples of the photographic photosensitive material ID include ID information recorded as a bar code or the like provided on the photographic photosensitive material, ID information stored in a magnetic layer, and ID information inputted by an operator. As described above, by a storing section or the like storing the processing condition of the image processing together with the photographic photosensitive material ID, the processing condition of image processing can be read from the photographic photosensitive material ID and utilized in the image processing, for example, not only when image processing is carried out initially on the image data such as at the time of simultaneous printing, but also when image processing is carried out again on the image data of the same image, such as during reprinting. Accordingly, in accordance with the first aspect of the present invention, it is possible to always carry out appropriate image processing without being affected by differences in development or differences over time. Further, when image processing is carried out again on image data of the same image such as at the time of reprinting, there is no need to again determine the processing condition for image processing, and the time required for image processing during reprinting can be shortened.

The processing condition may be in the form of a conversion (correction) table or may be in the form of a conversion (correction) formula. For example, an actual characteristic of the photographic photosensitive material which is the object of processing may be estimated on the basis of the predetermined exposure amount and the image data obtained by reading, and the processing condition may be determined from the results of estimation. (The characteristic may be newly estimated. Or, estimation may be carried out as follows: a standard characteristic of the photographic photosensitive material may be stored, the amount of variation in the characteristic may be determined from the read data, and the stored characteristic may be corrected). Further, for example, it is possible to determine the processing condition by correcting the processing condition, which is determined from a standard characteristic of the photographic photosensitive material, on the basis of the amount of variation in the characteristic of the photographic photosensitive material, without estimating the characteristic of the photographic photosensitive material.

In a second aspect of the present invention, in the first aspect, when image processing is to be carried out on the image data, a determination is made as to whether a photographic photosensitive material ID of a corresponding photographic photosensitive material is stored, and if the photographic photosensitive material ID is stored, image processing is carried out on the basis of a processing condition of the image processing stored together with the photographic photosensitive material ID.

In accordance with the second aspect, in the first aspect, when image processing is to be carried out on the image data, a determination is made as to whether the corresponding photographic photosensitive material ID is stored. In this determination, if it is determined that the photographic photosensitive material ID is stored, the processing condition of the image processing, which is stored together with the photographic photosensitive material ID, is read, and image processing is carried out on the basis of the read processing condition.

For example, if image processing is to be carried out again on image data of the same image such as in the case of reprinting, a determination is made as to whether the photographic photosensitive material ID is stored. If the photographic photosensitive material ID is stored, the processing condition of the image processing which is stored together with the photographic photosensitive material ID is read, and image processing is carried out. Therefore, image processing which is similar to the image processing at the time the printing was first carried out can be effected.

In a third aspect of the present invention, in the first aspect, when the photographic photosensitive material is manufactured, or during a time when the photographic photosensitive material is loaded in a photographing device, or at a time when an image recorded on the photographic photosensitive material is developed, the photographic photosensitive material ID is applied to the entire photographic photosensitive material per image recorded on the photographic photosensitive material.

In accordance with the third aspect of the present invention, in the first aspect, even if the photographic photosensitive material is cut after development, because the photographic photosensitive material ID is applied over the entire photographic photosensitive material for each of the recorded images, even if a photographic photosensitive material is cut, the processing condition for image processing can be read from the photographic photosensitive material ID and image processing ca be carried out.

A fourth aspect of the present invention is an image processing method comprising the steps of: exposing a predetermined region on a photographic photosensitive material at a predetermined exposure amount; reading the predetermined region of the photographic photosensitive material after the photographic photosensitive material has been developed; on the basis of read data obtained by the step of reading, determining a processing condition for image processing for converting, in accordance with a characteristic of the photographic photosensitive material, image data obtained by reading an image recorded in an image recording region of the photographic photosensitive material; and storing the determined processing condition together with image characteristic data expressing a characteristic of the image data.

In accordance with the fourth aspect of the invention, the predetermined region of the photographic photosensitive material such as a photographic film is exposed at a predetermined exposure amount and developed. The predetermined region is read, and on the basis of the read data obtained by the reading (e.g., data expressing the density of the predetermined region), a processing condition is determined for image processing for converting, in accordance with a characteristic of the photographic photosensitive material, the image data obtained by reading the image recorded in the image recording region. (The image processing may be, for example, image processing for converting, in accordance with a characteristic of the photographic photosensitive material, gradation of the image expressed by the image data, such as gray gradation balance correction for correcting the balance of the three colors of R, G, B of the gray gradation in a normal exposure region of the image, or non-linearity correction of the photographic photosensitive material for correcting the non-linear portions in the characteristic of the photographic photosensitive material (the exposure amount-color formed density characteristic)).

The density after development of the predetermined region exposed at the predetermined amount of exposure is a value in which are reflected variations in the characteristic (exposure amount-color formed density characteristic) of the photographic photosensitive material which variations accompany variations over time or variations in the developing conditions of the photographic photosensitive material. Therefore, on the basis of the read data, the actual characteristic of the photographic photosensitive material can be estimated with higher accuracy from the density of the predetermined region determined from the exposure amount onto the predetermined region (the predetermined exposure amount) and the read data. In the fourth aspect of the present invention, the processing condition of the image processing for converting the image data in accordance with the characteristic of the photographic photosensitive material is determined on the basis of the read data. Thus, variations in the characteristic of the photographic photosensitive material are reflected in the processing condition, and processing conditions can be obtained which always enable appropriate image processing without being affected by the type of the photographic photosensitive material, or changes over time, or the developing conditions.

Further, in the fourth aspect, the processing condition of the image processing is stored together with image characteristic data expressing a characteristic of the image recorded on the photographic photosensitive material. (Examples of the image characteristic data include a density histogram, image data expressing a compressed image, and image characteristic data which enables identification of the image, such as rough image data). In this way, by storing in a storing section or the like the processing condition of the image processing together with the image characteristic data, the processing condition of the image processing can be read from the image characteristic data and can be used in the image processing, for example, not only when image processing is carried out initially on the image data as in the case of simultaneous printing, but also when image processing is carried out again on the same image data as in the case of reprinting. Accordingly, in accordance with the fourth aspect, appropriate image processing can always be carried out without being affected by differences in development or differences over time. Further, when image processing is carried out again on image data of the same image as in the case of reprinting or the like, there is no need to determined the processing condition for image processing again, and the image processing time during reprinting can be shortened.

Further, the processing condition may be in the form of a conversion (correction) table or may be in the form of a conversion (correction) formula. For example, an actual characteristic of the photographic photosensitive material which is the object of processing may be estimated on the basis of the predetermined exposure amount and the image data obtained by reading, and the processing condition may be determined from the results of estimation. (The characteristic may be newly estimated. Or, estimation may be carried out as follows: a standard characteristic of the photographic photosensitive material may be stored, the amount of variation in the characteristic may be determined from the read data, and the stored characteristic may be corrected). Further, for example, it is possible to determine the processing condition by correcting the processing condition, which is determined from a standard characteristic of the photographic photosensitive material, on the basis of the amount of variation in the characteristic of the photographic photosensitive material, without estimating the characteristic of the photographic photosensitive material.

In a fifth aspect of the present invention, in the fourth aspect, when image processing is to be carried out on the image data, the image characteristic data is prepared from the image data, a determination is made as to whether the image characteristic data is stored, and if the image characteristic data is stored, image processing is carried out on the basis of the processing condition stored together with the image characteristic data.

In accordance with the fifth aspect of the invention, in the fourth aspect, when image processing is to be carried out on the image data, image characteristic data is prepared from the image data, and a determination is made as to whether corresponding image characteristic data is stored. If it is judged in this determination that image characteristic data is stored, the processing condition of the image processing stored together with the image characteristic data is read, and image processing is carried out on the basis of the read processing condition.

For example, when image processing is to be carried out again on image data of the same image as in the case of reprinting, a determination is made as to whether the image characteristic data is stored. If the image characteristic data is stored, the processing condition of the image processing stored together with the image characteristic data is read and image processing is carried out. Thus, image processing which is similar to the initial printing can be carried out.

In a sixth aspect of the present invention, in the first aspect, a correcting means corrects the determined processing condition, and the corrected processing condition is stored.

In accordance with the sixth aspect, in the invention of the first aspect, the processing condition of the determined image processing is corrected by the correcting means and stored, and appropriate image processing can thereby be carried out. For example, while viewing a print for which the determined image processing has been carried out, the processing condition of the image processing can be corrected by the correcting means and stored. In this way, when reprinting or the like is carried out, prints, which have been subjected to image processing under appropriate processing conditions, can be obtained.

In a seventh aspect of the present invention, in the first aspect, the read data is stored in place of the processing condition.

In accordance with the seventh aspect, in the first aspect of the present invention, even if read data, which is obtained by reading the predetermined region of the photographic photosensitive material, is stored in place of the processing condition of the image processing, by determining the processing condition for image processing on the basis of the read data at the time of reprinting, the same effects can be obtained as those in a case in which the processing condition for image processing is stored.

When a processing condition of image processing is stored, a processing condition must be stored for each frame of the photographic photosensitive material such as a film. When read data is stored, it suffices to store data common to all of the frames for one film. Thus, handling of stored data is simplified.

In the eighth aspect of the present invention, in the first aspect, the predetermined region is at least one of a leading end portion, a trailing end portion, an outer edge portion, or a space portion between image recording regions, of the photographic photosensitive material.

In accordance with the eighth aspect of the present invention, in the first aspect, the predetermined region which is exposed at the predetermined exposure amount on the photographic photosensitive material is at least one of the leading portion of the photographic photosensitive material (the leader portion), the final end portion (the trailer portion), a peripheral edge portion, and a space between image recording regions (between frames).

A ninth aspect of the present invention is an image processing method comprising the steps of: carrying out exposure at a predetermined exposure amount for each of images recorded on a photographic photosensitive material; reading results of the exposure at the predetermined exposure amount, after the photographic photosensitive material has been developed; and on the basis of read data obtained by the step of reading, determining a processing condition for image processing for converting, in accordance with a characteristic of the photographic photosensitive material, image data which was obtained by reading the image.

In accordance with the ninth aspect of the present invention, exposure is carried out at a predetermined exposure amount for each of the images recorded on the photographic photosensitive material such as a photographic film, and the photographic photosensitive material is developed. The results of exposure at the predetermined exposure amount are read, and on the basis of the read data obtained by the reading (e.g., data expressing the density at the exposure at the predetermined exposure amount), a processing condition is determined for image processing for converting, in accordance with a characteristic of the photographic photosensitive material, the image data obtained by reading the image recorded in the image recording region. (The image processing may be, for example, image processing for converting, in accordance with a characteristic of the photographic photosensitive material, gradation of the image expressed by the image data, such as gray gradation balance correction for correcting the balance of the three colors of R, G, B of the gray gradation in a normal exposure region of the image, or non-linearity correction of the photographic photosensitive material for correcting the non-linear portions in the characteristic of the photographic photosensitive material (the exposure amount-color formed density characteristic)).

The density after development of the portion exposed at the predetermined amount of exposure is a value in which are reflected variations in the characteristic (exposure amount-color formed density characteristic) of the photographic photosensitive material which variations accompany variations over time or variations in the developing conditions of the photographic photosensitive material. Therefore, on the basis of the read data, the actual characteristic of the photographic photosensitive material can be estimated with higher accuracy from the predetermined exposure amount and the density of the portion exposed at the predetermined exposure amount determined from the read data. In the ninth aspect of the present invention, the processing condition of the image processing for converting the image data in accordance with the characteristic of the photographic photosensitive material is determined on the basis of the read data. Thus, variations in the characteristic of the photographic photosensitive material are reflected in the processing condition, and processing conditions can be obtained which always enable appropriate image processing without being affected by the type of the photographic photosensitive material, or changes over time, or the developing conditions.

Further, in the ninth aspect, exposure at the predetermined exposure amount is carried out for each of the images recorded on the photographic photosensitive material. For example, even in a case in which the photographic photosensitive material is cut into units of a predetermined number of images or the like, the portion exposed at the predetermined exposure amount is present for each of the images. Thus, the results of exposure at the predetermined exposure amount can be read, and on the basis of the read data obtained by reading, the processing condition of the image processing can be determined. Namely, the processing condition of the image processing can be determined from the results of exposure at the predetermined exposure amount and image processing can be carried out not only when image processing is carried out initially on the image data as in the case of simultaneous printing, but also when image processing is carried out again on the image data of the same image as in the case of reprinting. Accordingly, in accordance with the ninth aspect, appropriate image processing can always be carried out without being affected by differences in development or differences over time.

In a tenth aspect of the present invention, in the first aspect, the step of exposing at a predetermined exposure amount is carried out at the time that the photographic photosensitive material is being developed by a developing apparatus.

In accordance with the tenth aspect of the present invention, in the first aspect, the exposure at the predetermined exposure amount which is carried out on the photographic photosensitive material is carried out at the time that the photographic photosensitive material is developed by a developing apparatus. Namely, when image processing is being carried out at an image processing device, the portion exposed at the predetermined exposure amount on the photographic photosensitive material is read, and the processing condition of the image processing can be determined from the data obtained by the reading. Further, in this way, the portion exposed at the predetermined exposure by the developing apparatus reflects variations at the time of developing at the developing apparatus, e.g., developing differences caused by developing processing differences such as developing solutions or fluctuations in the developing conditions. Accordingly, image processing, from which effects such as differences in the developing processing and differences in developing are removed, can be carried out.

In an eleventh aspect of the present invention, in the first aspect, the step of exposing at a predetermined exposure amount is carried out at the time of manufacturing the photographic photosensitive material.

In accordance with the eleventh aspect of the present invention, in the first aspect of the present invention, the exposure at the predetermined exposure amount which is carried out on the photographic photosensitive material is carried out at the time the photographic photosensitive material is manufactured. Namely, when image processing is carried out at an image processing device, the portion which is exposed at the predetermined exposure amount on the photographic photosensitive material is read, and the processing condition of the image processing can be determined from the data obtained by reading. Further, the density after development of the portion exposed at the predetermined exposure amount is a value that reflects fluctuations in the photographic photosensitive material characteristic, which fluctuations accompany changes over time or variations in the developing conditions of the photographic photosensitive material. Accordingly, image processing, from which effects of differences in developing and differences due to time are removed, can be carried out.

In a twelfth aspect of the present invention, in the first aspect, the step of exposing at the predetermined exposure amount is carried out while the photographic photosensitive material is set in a photographing camera which records an image.

In accordance with the twelfth aspect, in the first aspect of the present invention, the exposure at the predetermined exposure amount carried out on the photographic photosensitive material is carried out while the photographic photosensitive material is set in a photographing camera which records images. For example, a light source which emits light of the light amount of the predetermined exposure amount may be provided in the photographing camera, and exposure at the predetermined exposure amount can be carried out at the same time the photographic photosensitive material is set or during photographing. In this way, while image processing is being carried out at an image processing apparatus, the portion exposed at the predetermined exposure amount on the photographic photosensitive material is read, and the processing condition of the image processing can be determined from the data obtained by reading. The density after development of the portion exposed at the predetermined exposure amount is a value which reflects variations in the photographic photosensitive material characteristic, which variations accompany changes over time or variations in developing conditions of the photographic photosensitive material. Accordingly, image processing, from which effects of differences in development and differences over time are removed, can be carried out.

In a thirteenth aspect of the present invention, in the first aspect, the step of exposing at the predetermined exposure amount is carried out plural times at respectively different exposure amounts.

In accordance with the thirteenth aspect of the present invention, in the first aspect, the exposure at the predetermined exposure amount is carried out plural times at respectively different exposure amounts. Namely, exposure is carried out by changing the exposure level in a stepwise manner. By carrying out such stepwise exposure, the photographic photosensitive material characteristic can be estimated from the stepped exposure levels and the density of the photographic photosensitive material corresponding to the exposure level.

Further, a conversion (correction) table or a conversion (correction) formula may be determined as the processing condition for image processing for converting the image in accordance with the characteristic of the photographic photosensitive material from the estimated photographic photosensitive material characteristic. By making the intervals of the exposure levels more fine, an accurate photographic photosensitive material characteristic can be obtained. Further, a conversion (correction) table or a conversion (correction) formula may prepared directly without preparing a photographic photosensitive material characteristic.

In a fourteenth aspect of the present invention, in the first aspect, the exposure at the predetermined exposure amount is gray exposure, red single color exposure, green single color exposure, or blue single color exposure.

In accordance with the fourteenth aspect of the present invention, in the first aspect, gray exposure or any of single color exposure of R, G, or B can be used as the exposure at the predetermined exposure amount.

In a fifteenth aspect of the present invention, in the first aspect, the read data is one of data representing gray gradation and data representing graininess.

In accordance with the fifteenth aspect of the present invention, in the first aspect, the read data obtained by reading the portion exposed at the predetermined exposure amount can be used in determining the processing condition for image processing of data which is data expressing a gray gradation or data expressing graininess of the image.

In a sixteenth aspect of the present invention, in the first aspect, the image processing includes at least one of gray gradation balance correction processing, processing for correcting non-linearity of the photographic photosensitive material, graininess suppressing processing, and sharpness processing.

In accordance with the sixteenth aspect, in the first aspect of the present invention, image processing for effecting conversion in accordance with a characteristic of the photographic photosensitive material is image processing including at least one of gray gradation balance correction processing, non-linearity characteristic correction processing of the photographic photosensitive material, graininess suppressing processing for suppressing graininess, and sharpness processing for enhancing the sharpness or the like.

A seventeenth aspect of the present invention is an image processing device comprising: a reading section which reads regions of a photographic photosensitive material including a standard exposure portion which is exposed in advance in a predetermined region of the photographic photosensitive material at a predetermined exposure amount, and an image which is recorded in an image recording region of the photographic photosensitive material; a processing condition determining section which, on the basis of read data obtained by the reading section reading the standard exposure portion, determines a processing condition for image processing for converting, in accordance with a characteristic of the photographic photosensitive material, image data which is obtained by the reading section reading the image recorded in the image recording region; and a storing section which stores the processing condition, determined by the processing condition determining section, together with a photographic photosensitive material ID which is applied to the photographic photosensitive material.

In accordance with the seventeenth aspect, the reading section reads the standard exposure portion, which is exposed at the predetermined exposure amount in a predetermined region of the photographic photosensitive material, and reads an image, which is recorded in an image recording region of the photographic photosensitive material. On the basis of read data obtained by the reading section reading the standard exposure portion (e.g., data expressing the density of the predetermined region), the processing condition determining section determines a processing condition for image processing for converting, in accordance with a characteristic of the photographic photosensitive material, the image data obtained by the reading section reading the image recorded in the image recording region. (The image processing may be, for example, image processing for converting, in accordance with a characteristic of the photographic photosensitive material, gradation of the image expressed by the image data, such as gray gradation balance correction for correcting the balance of the three colors of R, G, B of the gray gradation in a normal exposure region of the image, or non-linearity correction of the photographic photosensitive material for correcting the non-linear portions in the characteristic of the photographic photosensitive material (the exposure amount-color formed density characteristic)).

The density after development of the predetermined region exposed at the predetermined amount of exposure is a value in which are reflected variations in the characteristic (exposure amount-color formed density characteristic) of the photographic photosensitive material which accompany variations over time or variations in the developing conditions of the photographic photosensitive material. Therefore, on the basis of the read data, the actual characteristic of the photographic photosensitive material can be estimated with higher accuracy from the density of the predetermined region determined from the exposure amount onto the predetermined region (the predetermined exposure amount) and the read data. In the seventeenth aspect of the present invention, the processing condition of the image processing for converting the image data in accordance with a characteristic of the photographic photosensitive material is determined on the basis of the read data. Thus, variations in the characteristic of the photographic photosensitive material are reflected in the processing condition, and processing conditions can be obtained which always enable appropriate image processing without being affected by the type of the photographic photosensitive material, or changes over time, or the developing conditions.

The storing section stores the processing condition of the image processing determined by the processing condition determining section, together with the photographic photosensitive material ID applied to the photographic photosensitive material. Examples of the photographic photosensitive material ID are ID information recorded in the form of a bar code or the like provided on the photographic photosensitive material, ID information stored in a magnetic layer, or ID information inputted by an operator. As described above, by the storing section storing the processing condition of the image processing together with the photographic photosensitive material ID, the processing condition of image processing can be read from the photographic photosensitive material ID and utilized in the image processing, for example, not only when image processing is carried out initially on the image data such as at the time of simultaneous printing, but also when image processing is carried out again on the image data of the same image, such as during reprinting. Accordingly, in accordance with the seventeenth aspect of the present invention, it is possible to always carry out appropriate image processing without being affected by differences in development or differences over time. Further, when image processing is carried out again on image data of the same image such as at the time of reprinting, there is no need to again determine the processing condition for image processing, and the time required for image processing during reprinting can be shortened.

The processing condition determined by the processing condition determining section may be in the form of a conversion (correction) table or may be in the form of a conversion (correction) formula. For example, an actual characteristic of the photographic photosensitive material which is the object of processing may be estimated on the basis of the predetermined exposure amount and the image data obtained by reading, and the processing condition may be determined from the results of estimation. (The characteristic may be newly estimated. Or, estimation may be carried out as follows: a standard characteristic of the photographic photosensitive material may be stored, the amount of variation in the characteristic may be determined from the read data, and the stored characteristic may be corrected). Further, for example, it is possible to determine the processing condition by correcting the processing condition, which is determined from a standard characteristic of the photographic photosensitive material, on the basis of the amount of variation in the characteristic of the photographic photosensitive material, without estimating the characteristic of the photographic photosensitive material.

An eighteenth aspect of the present invention is an image processing device comprising: a reading section which reads regions of a photographic photosensitive material including a standard exposure portion which is exposed in advance at a predetermined exposure amount and is provided for each of the images recorded on the photographic photosensitive material, and an image which is recorded in an image recording region of the photographic photosensitive material; and a processing condition determining section for, on the basis of read data obtained by the reading section reading the standard exposure portions, determining a processing condition for image processing for converting, in accordance with a characteristic of the photographic photosensitive material, image data which is obtained by the reading section reading the images recorded in image recording regions.

In accordance with the eighteenth aspect of the present invention, the reading section reads standard exposure portions, which are provided per image recorded on the photographic photosensitive material and which are exposed at the predetermined exposure amount, and reads the images recorded in the image recording regions of the photographic photosensitive material. On the basis of read data obtained by the reading section reading the standard exposure portion (e.g., data expressing the density of the predetermined region), the processing condition determining section determines a processing condition for image processing for converting, in accordance with a characteristic of the photographic photosensitive material, the image data obtained by the reading section reading the image recorded in the image recording region. (The image processing may be, for example, image processing for converting, in accordance with a characteristic of the photographic photosensitive material, gradation of the image expressed by the image data, such as gray gradation balance correction for correcting the balance of the three colors of R, G, B of the gray gradation in a normal exposure region of the image, or non-linearity correction of the photographic photosensitive material for correcting the non-linear linear portions in the characteristic of the photographic photosensitive material (the exposure amount-color formed density characteristic)).

The density after development of the standard exposure portions, which are provided per image recorded on the photographic photosensitive material and which are exposed at the predetermined amount of exposure, is a value in which are reflected variations in the characteristic (exposure amount-color formed density characteristic) of the photographic photosensitive material which accompany variations over time or variations in the developing conditions of the photographic photosensitive material. Therefore, on the basis of the read data, the actual characteristic of the photographic photosensitive material can be estimated with higher accuracy from the density of the standard exposure portion determined from the exposure amount of the standard exposure portion (the predetermined exposure amount) and the read data. In the eighteenth aspect of the present invention, the processing condition of the image processing for converting the image data in accordance with the characteristic of the photographic photosensitive material is determined on the basis of the read data. Thus, variations in the characteristic of the photographic photosensitive material are reflected in the processing condition, and processing conditions can be obtained which always enable appropriate image processing without being affected by the type of the photographic photosensitive material, or changes over time, or the developing conditions.

In the eighteenth aspect of the present invention, a standard exposure portion exposed at the predetermined exposure amount is provided for each of the images recorded on the photographic photosensitive material. Thus, on the basis of the read data obtained by the reading section reading the standard exposure portion, the processing condition for image processing can be determined in the same way as at the time of initial printing, for example, not only when image processing is carried out initially on the image data such as at the time of simultaneous printing, but also, when image processing is carried out again on the image data of the same image, such as during reprinting. Accordingly, in accordance with the eighteenth aspect of the present invention, it is possible to always carry out appropriate image processing without being affected by differences in development or differences over time.

Further, in the eighteenth aspect of the present invention, even in cases in which the photographic photosensitive material is cut into pieces, because a standard exposure portion is provided for each of the images recorded on the photographic photosensitive material, the processing conditions for image processing can be determined by the reading section reading the respective standard exposure portions. A nineteenth aspect of the present invention is an image processing device comprising: a reading section which reads regions of a photographic photosensitive material including a standard exposure portion which is exposed in advance in a predetermined region of the photographic photosensitive material at a predetermined exposure amount, and an image which is recorded in an image recording region of the photographic photosensitive material; a processing condition determining section which, on the basis of read data obtained by the reading section reading the standard exposure portion, determines a processing condition of image processing for converting, in accordance with a characteristic of the photographic photosensitive material, image data obtained by the reading section reading the image recorded in the image recording region; an image characteristic data computing section for, on the basis of image data obtained by the reading section reading the image recorded at the image recording region, computing image characteristic data expressing a characteristic of the image; and a storing section which stores, together with the image characteristic data computed by the image characteristic data computing section, the processing condition determined by the processing condition determining section.

In accordance with the nineteenth aspect, the reading section reads a standard exposure portion, which is exposed at a predetermined exposure amount at a predetermined region of a photographic photosensitive material, and an image, which is recorded at an image recording region of the photographic photosensitive material. On the basis of the read data obtained by the reading section reading the standard reading portion (e.g., on the basis of data expressing the density of the predetermined region), the processing condition determining section determines a processing condition of image processing for converting, in accordance with a characteristic of the photographic photosensitive material, the image data obtained by the reading section reading the image recorded in the image recording region. (The image processing may be, for example, image processing for converting, in accordance with a characteristic of the photographic photosensitive material, gradation of the image expressed by the image data, such as gray gradation balance correction for correcting the balance of the three colors of R, G, B of the gray gradation in a normal exposure region of the image, or non-linearity correction of the photographic photosensitive material for correcting the non-linear portions in the characteristic of the photographic photosensitive material (the exposure amount-color formed density characteristic)).

The density after development of the predetermined region exposed at the predetermined exposure amount is a value in which are reflected variations in the characteristic (exposure amount-color formed density characteristic) of the photographic photosensitive material which accompany variations over time or variations in the developing conditions of the photographic photosensitive material. Therefore, on the basis of the read data, the actual characteristic of the photographic photosensitive material can be estimated with high accuracy from the density of the predetermined region determined from the exposure amount of the predetermined region (the predetermined exposure amount) and the read data. In the nineteenth aspect of the present invention, the processing condition of the image processing for converting the image data in accordance with the characteristic of the photographic photosensitive material is determined on the basis of the read data. Thus, variations in the characteristic of the photographic photosensitive material are reflected in the processing condition, and processing conditions can be obtained which always enable appropriate image processing without being affected by the type of the photographic photosensitive material, or changes over time, or the developing conditions.

On the basis of the image data obtained by the reading section reading the image recorded in the image recording region, the image characteristic computing section computes image characteristic data expressing the characteristic of the image (e.g., image characteristic data by which the image can be identified, such as a density histogram, image data expressing a compressed image, or rough image data). Then, the storing section stores the processing condition of the image processing determined by the processing condition determining section, together with the image characteristic data computed by the image characteristic computing section. In this way, by storing the processing condition of the image processing together with the image characteristic data, the processing condition of image processing corresponding to the image characteristic data by which the image can be identified can be read and utilized in image processing for example, not only when image processing is carried out initially on the image data such as at the time of simultaneous printing, but also when image processing is carried out again on the image data of the same image, such as during reprinting. Accordingly, in accordance with the nineteenth aspect of the present invention, it is possible to always carry out appropriate image processing without being affected by differences in development or differences over time. Further, when image processing is carried out again on image data of the same image such as at the time of reprinting, there is no need to again determine the processing condition for image processing, and the time required for image processing during reprinting can be shortened.

The processing condition may be in the form of a conversion (correction) table or may be in the form of a conversion (correction) formula. For example, an actual characteristic of the photographic photosensitive material which is the object of processing may be estimated on the basis of the predetermined exposure amount and the image data obtained by reading, and the processing condition may be determined. (The characteristic may be newly estimated. Or, estimation may be carried out as follows: a standard characteristic of the photographic photosensitive material may be stored, the amount of variation in the characteristic may be determined from the read data, and the stored characteristic may be corrected). Further, for example, it is possible to determine the processing condition, which is determined from the standard characteristic of the photographic photosensitive material, by correction on the basis of the amount of variation in the characteristic of the photographic photosensitive material, without estimating the characteristic of the photographic photosensitive material.

DESCRIPTION OF THE PREFERRED EMBODIMENTS

An embodiment of the present invention will be described hereinafter in detail with reference to the figures.

Figure 1:
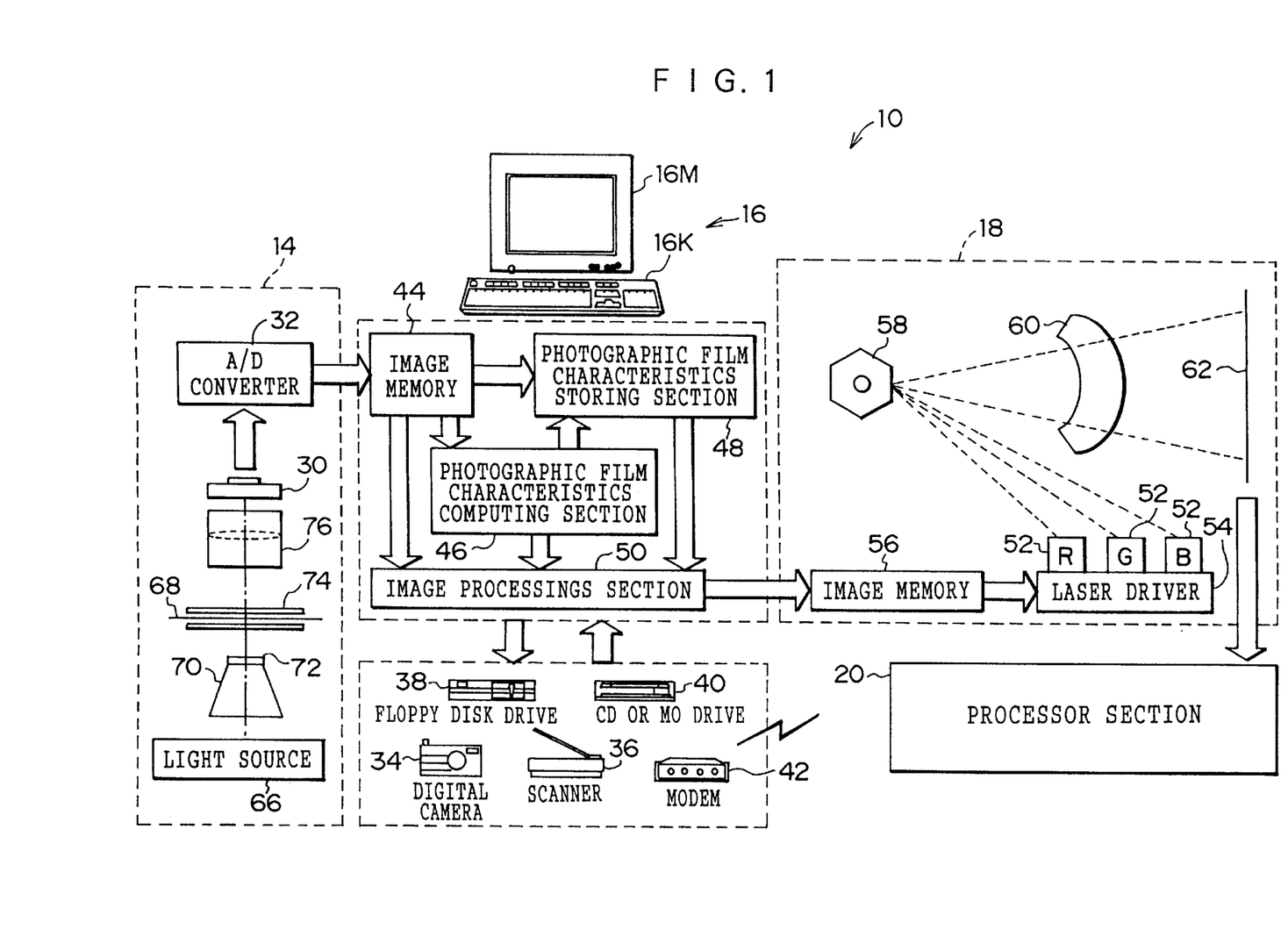
FIG. 1 is a schematic structural view of a digital laboratory system relating to an embodiment of the present invention.
Figure 2:
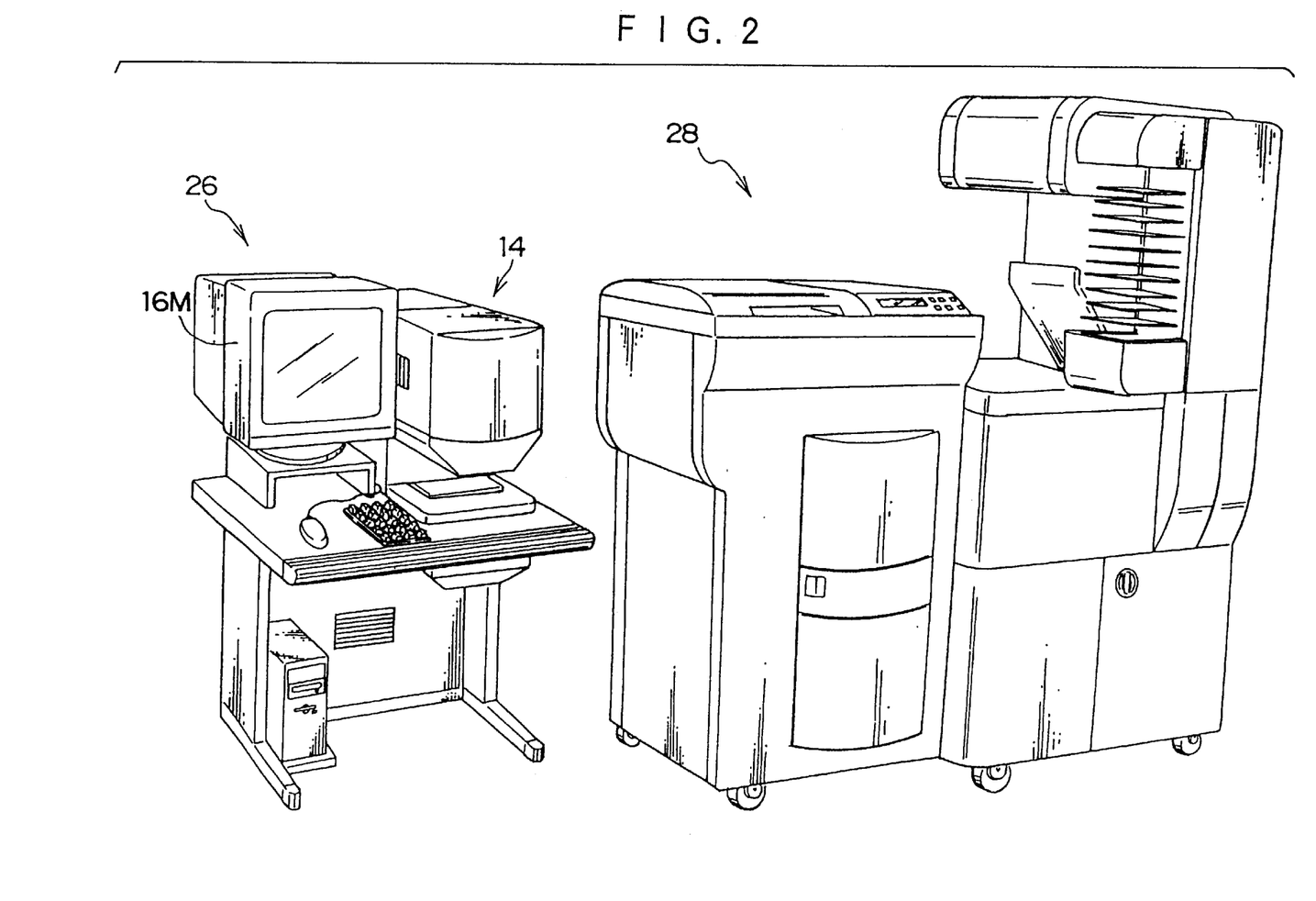
FIG. 2 is a view of the exterior of the digital laboratory system.

FIGS. 1 and 2 illustrate the schematic structure of a digital laboratory system 10 relating to the present embodiment.

As illustrated in FIG. 1, the digital laboratory system 10 includes a linear CCD scanner section 14, an image processing section 16, a laser printer section 18, and a processor section 20. The linear CCD scanner section 14 and the image processing section 16 are formed integrally as an input section 26 illustrated in FIG. 2. The laser printer section 18 and the processor section 20 are formed integrally as an output section 28 illustrated in FIG. 2.

The linear CCD scanner section 14 includes a light source 66 which illuminates light onto a photographic film 68. An acrylic block 70 and a light diffusing plate 72 are disposed in that order at the light irradiating side of the light source 66 in order to make the light illuminated onto the photographic film 68 diffused light. The acrylic block 70 serves as a light guiding member.

The photographic film 68 is conveyed such that the image surfaces of the image frames are disposed perpendicular to the optical axis, by a film carrier 74 which is disposed at the light exiting side of the acrylic block 70 (at the side at which the light diffusing plate 72 is disposed). A lens unit 76 and a linear CCD 30 are disposed at the side of the photographic film 68 opposite the side at which the light source 66 is disposed. The lens unit 76 focuses along the optical axis the light which has passed through the image frame.

The linear CCD scanner 14 is for reading a frame image recorded on a photographic film such as a negative film or a reversal film. Examples of photographic films whose frame images can be the object of reading include 135 size photographic films, 110 size photographic films, photographic films on which a transparent magnetic layer is formed (240 size photographic films, known as APS films), and 120 size and 220 size (Brownie size) photographic films. The linear CCD scanner section 14 reads the frame image which is the object of reading by the linear CCD 30. After A/D conversion at an A/D converter 32, the image data is outputted to the image processing section 16.

The image processing section 16 is structured such that image data (scan image data) outputted from the area CCD scanner section 14 may be inputted to the image processing section 16. Further, image data obtained by photographing by a digital camera 34 or the like, image data obtained by reading an original (e.g., a reflection original) by a scanner 36 (a flat-bed type scanner), image data generated at another computer, communications image data received via a modem 42, or the like (hereinafter, these image data will be referred to as file image data) may be inputted to the image processing section 16 from the outside.

The image processing section 16 is structured mainly by an image memory 44, a photographic film characteristics computation section 46, a photographic film characteristics storing section 48, and a plural image processing section 50. The image data inputted from the linear CCD scanner 14 is stored in the image memory 44. The photographic film characteristics computation section 46 computes (as will be described later) the characteristics of the photographic film from data recorded outside of image recording regions, which data is included among the image data obtained by the linear CCD scanner 14 reading the image recording regions as well as the regions outside the image recording regions of the photographic film 68. The computed photographic film characteristics are stored in the photographic film characteristics storing section 48, and are outputted to the image processings section 50 which carries out various types of image processing such as gray gradation balance correction, film non-linearity correction, color gradation processing, hypertone processing, hypersharpness processing, and the like. The image processings section 50 carries out the image processings such as the aforementioned various types of correction, and outputs the data which was subjected to image processings to the laser printer section 18 as image data for recording. Further, the image processing section 16 can output the image data which was subjected to image processings to the exterior as an image file (e.g., can output the data to a recording medium such as FD 38, MO 40, CD 40 or the like, or can send the data to another information processing device via a communications line, or the like).

The image processing at the image processings section 50 is not limited to those described above. Other image processings, for example, graininess suppressing processing for suppressing the graininess of an image recorded on the photographic film 68, may be carried out.

The laser printer section 18 is provided with R, G, B laser light sources 52. A laser driver 54 is controlled such that laser light modulated in accordance with the image data for recording which has been inputted from the image processing section 16 (and temporarily stored in an image memory 56) is irradiated onto a photographic printing paper 62. An image is recorded onto the photographic printing paper 62 due to this scanning exposure (in the present embodiment, an optical system mainly using a polygon mirror 58 and an fθ lens 60). Further, in the processor section 20, the photographic printing paper 62, on which the image has been recorded by scanning exposure in the laser printer section 18, is subjected to various processings such as color developing, bleaching fixing, washing and drying. An image is thereby formed on the photographic printing paper 62.

Next, an example of the photographic film used in the digital laboratory system 10 having the above described structure will be described with reference to FIG. 3.

As illustrated in FIGS. 3A through 3D, on the photographic film 68 which is a 135 size photographic film, a 110 size photographic film, an APS film or the like, standard exposure portions 80 are formed at at least one of the leader portion (beginning portion), trailer portion (ending portion), gap portions between the frame images (between the frames), and outer edge portions. The standard exposure portions 80 are formed by a standard light source, which emits light of a predetermined exposure amount, carrying out exposure with the predetermined light amount being varied in steps. The stepwise exposure interval of the standard exposure portion 80 is formed by carrying out exposure at equal intervals at a level which is the logarithm (log E) of the exposure amount, and is preferably made as fine as possible within a range of resolution which can be read by a scanner such as the linear CCD scanner 14. The standard exposure portion 80 may be formed by gray exposure, or may be formed by single color exposure of one of R, G, and B.

Figure 6:
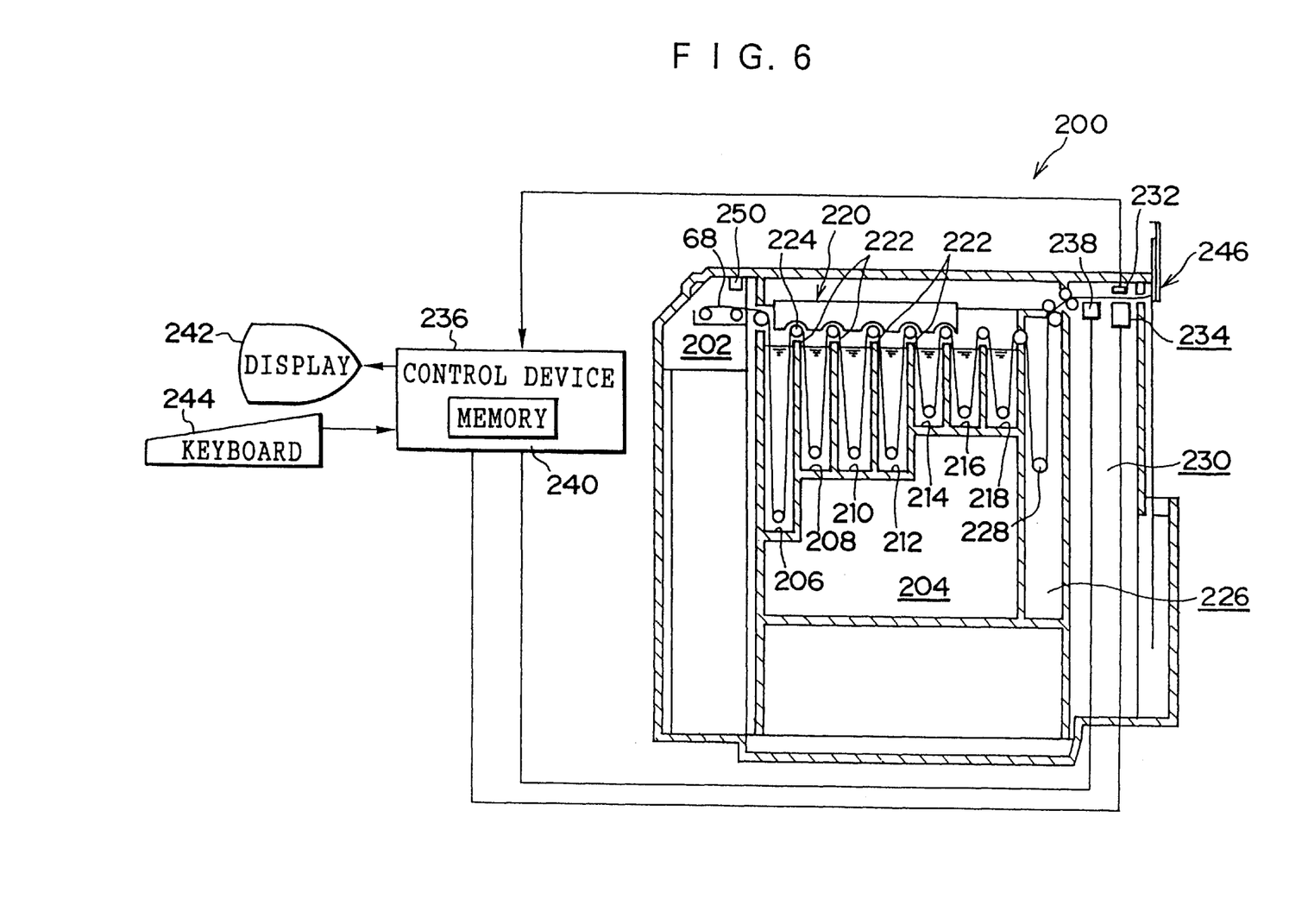
FIG. 6 is a view illustrating a schematic structure of a developer which carries out standard exposure.

The standard exposure portion 80 of the photographic film 68 is exposed by the developer 200 illustrated in FIG. 6. The developer 200 has a film loading section 202. By opening a cover (not shown), the interior of the film loading section 202 is exposed, and a photographic film, which is a photographic photosensitive material on which images have been exposed by photography, is loaded into the film loading section 202.

The photographic film 68 loaded in the photographic film loading section 202 is exposed in a stepwise manner as described above by a standard light source 250 which is provided at the film loading section 202 and emits light at a predetermined amount of exposure. The photographic film 68 is then conveyed into a processor section 204. In the processor section 204, processing tanks which are a developing tank 206, a bleaching tank 208, a bleaching-fixing tank 210, a fixing tank 212, rinsing tanks 214, 216, and a stabilizing tank 218 are disposed in that order, and developing solution, bleaching solution, bleaching-fixing solution, fixing solution, rinsing solution, and stabilizing solution are stored therein. A crossover rack 220 is disposed above the respective processing tanks. The crossover rack 220 has rollers 224 corresponding to partitioning plates 222 which partition the respective processing tanks. The rollers 224 form transfer-conveying paths between the respective processing tanks. The photographic film 68 is transferred between processing tanks by being trained around the rollers 224, and is immersed into and processed in the respective processing solutions.

A drying section 226 is disposed next to the processor section 204. A roller 228 is disposed in the drying section 226. The photographic film 68 which is discharged from the processor section 204 is guided into the drying section 226, is trained around the roller 228, and is subjected to drying processing. Thereafter, the photographic film 68 is conveyed to a density measuring section 230 which is adjacent the drying section 226.

In the density measuring section 230, an optical system 232, which includes a light source and C, M, Y filters, and a densitometer 234, which divides the image recorded on the photographic film 68 into plural portions and measures the density of each of the portions, are disposed so as to oppose one another across the conveying path of the photographic film 68. By the optical system 232 and the densitometer 234, the density of an image on the photographic film 68, which has been subjected to the series of processings in the processor section 204 and on which an image has been made visible, is divided into plural portions, each of which is divided into the three colors of R, G, B and then measured. The densities of the portions of the photographic film 68 other than the image regions thereof are also divided into three colors and measured by the optical system 232 and the densitometer 234. The optical system 232 and the densitometer 234 are connected to a control device 236, and the results of measurement are outputted to the control device 236.

The densitometer 234 is provided with a bar code reader 238 which reads a bar code, such as a DX code or the like, recorded on the side portion of the photographic film. The bar code reader 238 is connected to the control device 236. Information expressed by the read bar code is outputted to the control device 236. The control device 236 includes a non-volatile memory 240 such as a back-up RAM. A display 242, such as a liquid crystal display for displaying various types of information, and a keyboard 244 for the input of various types of data and commands and the like, are connected to the control device 236. The photographic film 68 which has passed through the density measuring section 230 is discharged to the exterior of the developer 200 by a film stacker 246.

The standard exposure portion 80 may be exposed at the time of manufacturing the photographic film 68, or a standard light source which emits light at a predetermined exposure amount may be provided within a photographing camera such that the standard exposure portion 80 is formed before photographing or at the time of photographing.

Figure 4:
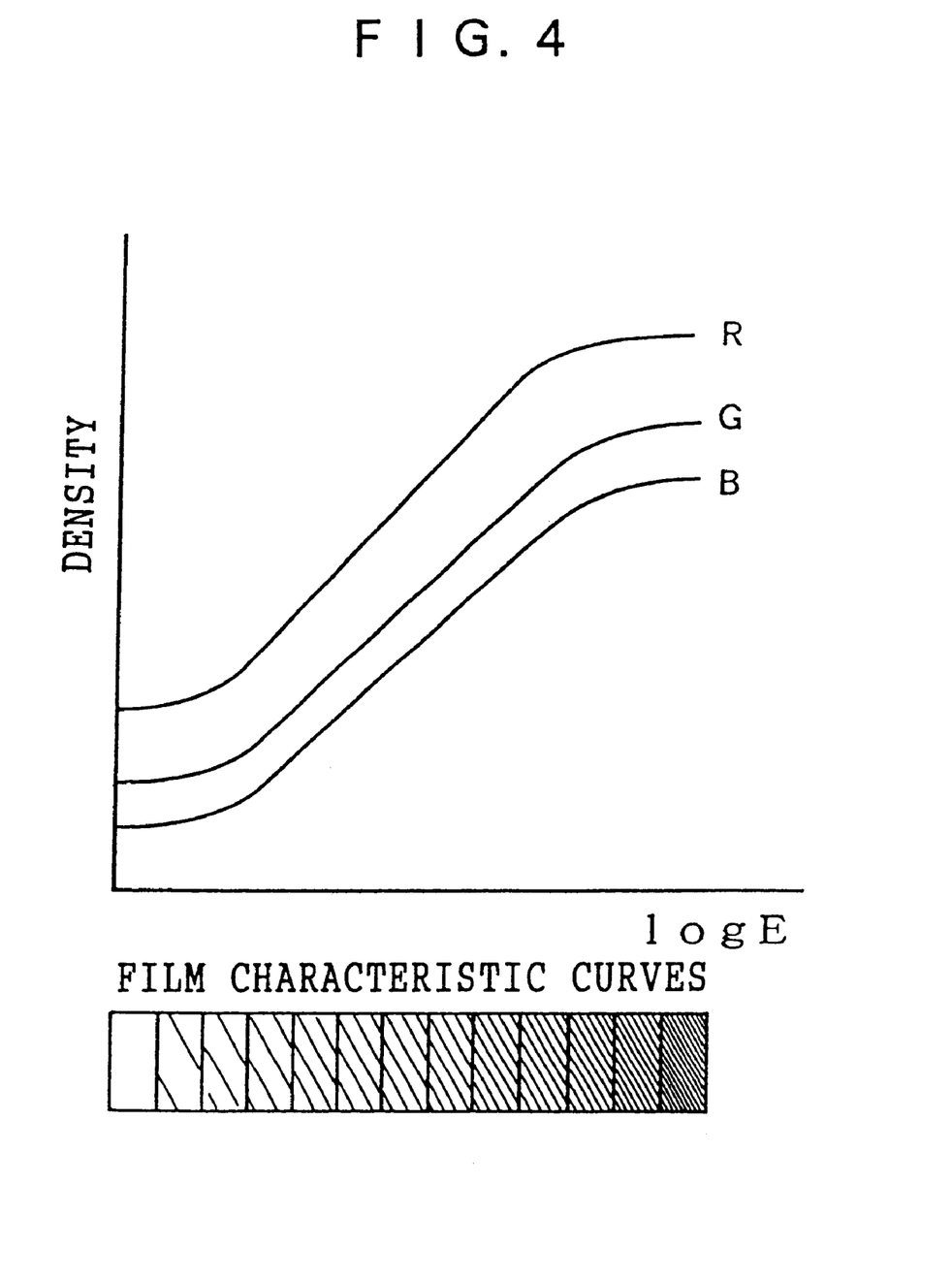
FIG. 4 is a diagram showing photographic film characteristic calculation.

Next, photographic film characteristics computation carried out by the photographic film characteristics computation section 46 will be described. The photographic film 68, which has been exposed previously by the standard light source as described above, is read by the linear CCD scanner 14. The digital laboratory system 10 of the present embodiment can thereby obtain density data (e.g., data expressing the gray gradation) corresponding to the exposure levels. Here, as illustrated in FIG. 4, by plotting the density data generated by the stepwise exposure on a graph whose horizontal axis is log E (the logarithm of the exposure amount) and whose vertical axis is the density data, and by computing by estimation the characteristic between the respective points by using the method of least squares, characteristic curves (photographic film characteristics) for the respective three colors R, G, B of the photographic film 68 can be prepared.

In order to, for example, carry out gray gradation balance correction or non-linearity correction, image processing is carried out as follows. Only the gamma characteristic of the linear portion of each of the R, G, B photographic film characteristics prepared as described above (i.e., only the linear regions of the photographic film characteristics) are varied. The non-linear portions of the underexposure region and the over exposure region are corrected by an amount of non-linearity corresponding to the linear regions, and the characteristic curves are converted into photographic film non-linearity correction tables which are the converted characteristics illustrated in FIG. 5. Further, the non-linearity correction tables and the like of the photographic film obtained as described above are stored in the photographic film characteristics storing section 48 in correspondence with the photographic film ID recorded in the bar code or in the magnetic layer usually provided at a photographic film. In this way, the photographic film characteristics (including the correction tables) are stored in the photographic film characteristics storing section 48 in correspondence with the photographic film ID. Thus, at the time of reprinting, image processing can be carried out on the basis of the data stored in the photographic film characteristics storing section 48. The processing time is shortened, and printing processing which is similar to that at the time of initial printing can be carried out.

Figure 7:
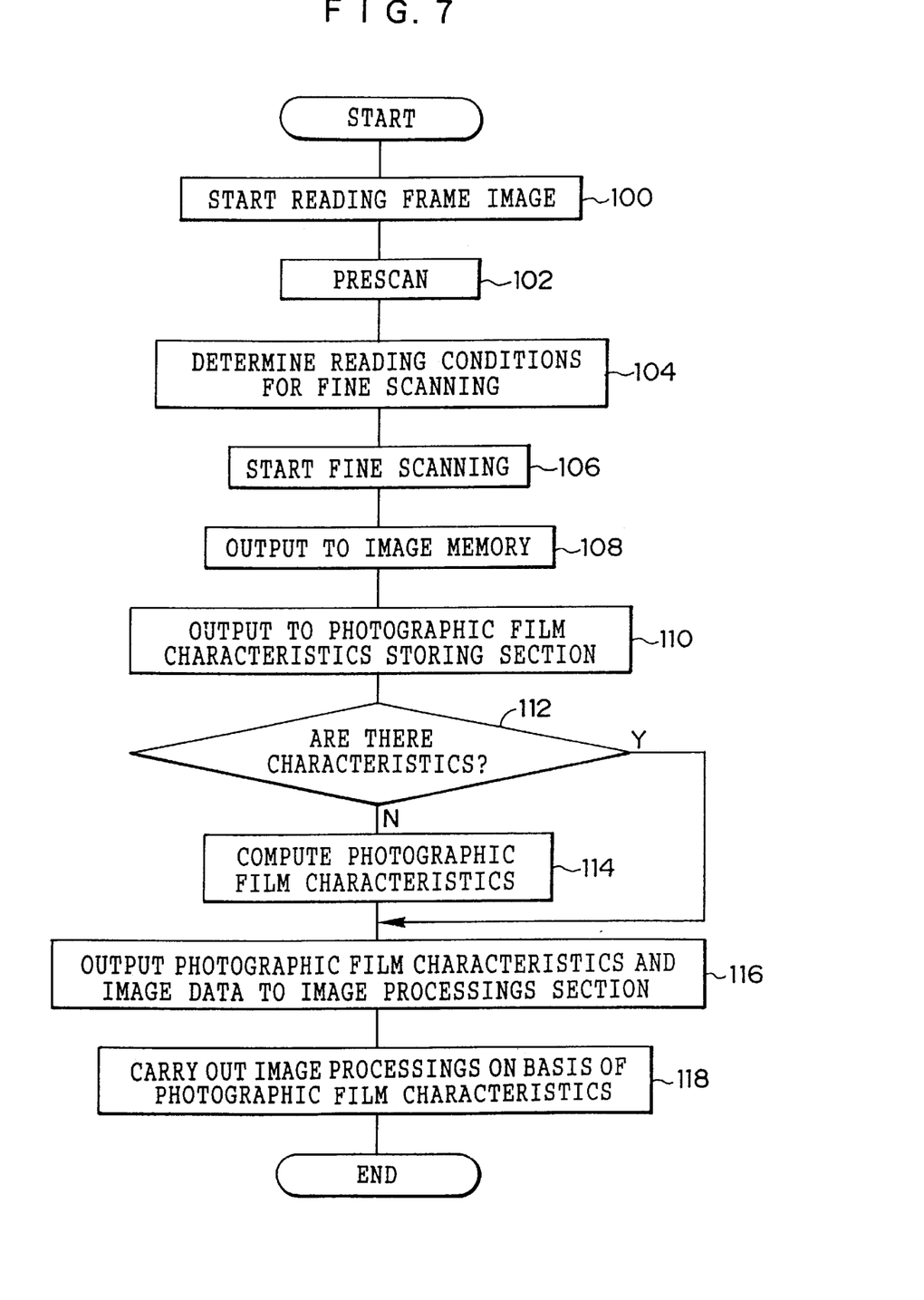
FIG. 7 is a flowchart for explaining operation of the embodiment of the present invention.

Next, explanation of the operation of the present embodiment will be given with reference to the flowchart of FIG. 7.

In step 100, when the operator inserts the photographic film 68 into the film carrier 74 and designates starting of reading of the image frame by using the keyboard 16K of the image processing section 16, the conveying of the photographic film 68 by the film carrier 74 begins, and the routine proceeds to step 102. In step 102, prescanning is carried out by this conveying. Namely, while the photographic film 68 is conveyed at a relatively high speed, the linear CCD scanner 14 reads not only the image frames, but also various types of image data, such as a bar code or the like recorded on the photographic film and serving as a photographic film ID recorded outside of the image recording regions of the photographic film 68. The read images are displayed on a monitor 16M so that they can be confirmed by the operator.

Next, the routine moves on to step 104 where, on the basis of the results of prescanning, the reading conditions for fine scanning are determined, and the process moves on to step 106. In step 106, fine scanning is carried out in accordance with the reading conditions determined in step 104, and the routine proceeds to step 108. In step 108, the image data read by the fine scanning is outputted to the image memory 44 of the image processing section 16, and the routine moves onto step 110. In step 110, the photographic film ID and the data of the standard exposure portion 80, such as that illustrated in FIG. 3 which is exposed by the standard light source 250 so as to be recorded outside of the image recording regions and which is read by the prescanning or fine scanning, are outputted to the photographic film characteristics storing section 48. The routine then proceeds to step 112. Here, the photographic film ID which is recorded outside of the image recording regions of the photographic film is read, but the operator may input photographic film ID information.

In step 112, a determination is made, from the read photographic film ID as to whether the photographic film characteristics are stored in the photographic film characteristics storing section 48. If it is determined in step 112 that photographic film characteristics are not stored, the routine moves on to step 114. In step 114, the photographic film characteristics are computed by the photographic film characteristics computation section 46, and the photographic film ID and the photographic film characteristics are stored in the photographic film characteristics storing section 48. The routine then moves on to step 116. In step 116, the photographic film characteristics and the image data read by the linear CCD scanner 14 are outputted to the image processings section 50. In the subsequent step 118, on the basis of photographic film characteristics, various types of image processings, such as gray gradation balance correction, photographic film non-linearity correction, color gradation processing, hypertone processing, hypersharpness processing, and the like are carried out, and the series of processings ends.

Figure 5:
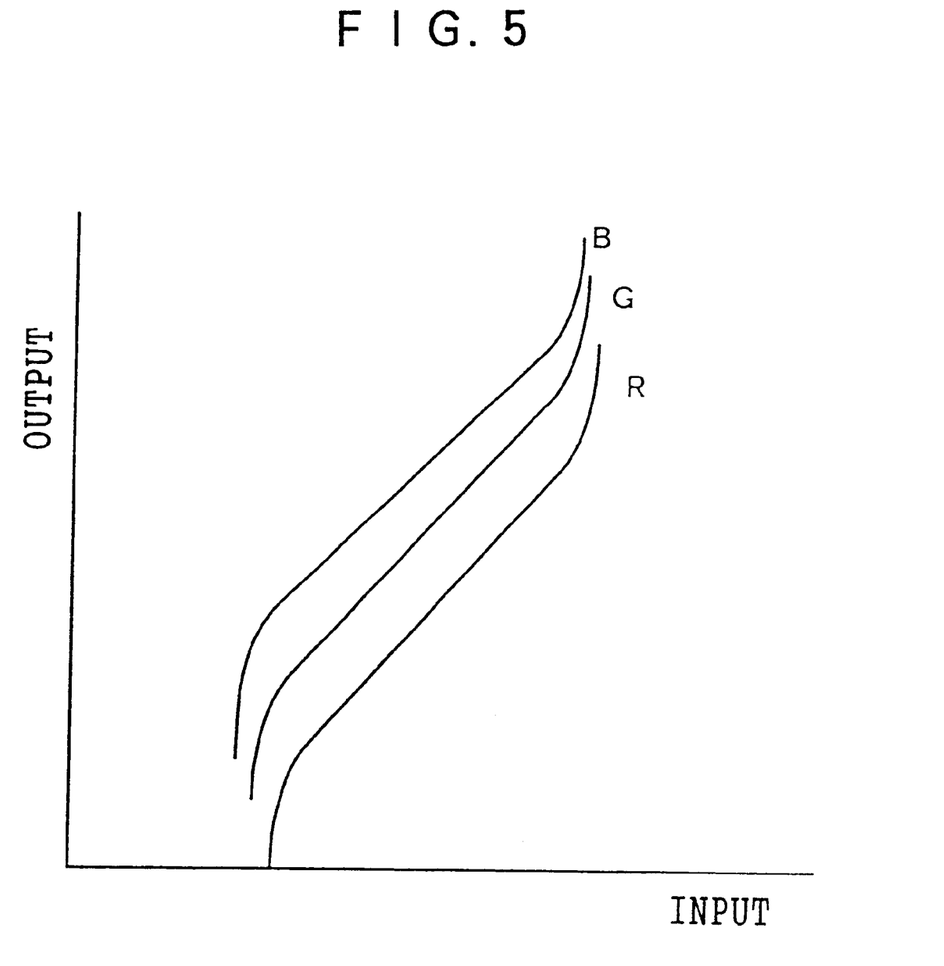
FIG. 5 is a diagram showing correction tables obtained from photographic film characteristics.

In the gray gradation balance correction and photographic film non-linearity correction, the R, G, B conversion data having the conversion characteristics illustrated in FIG. 5 are set in separate look-up tables (LUTs), and the image data is converted by inputting the image data into the LUT.

In this way, in step 114, the photographic film characteristics are computed from the standard exposure portion 80 which exposed by the standard light source 250 and recorded outside of the image recording regions of the photographic film 68, and image processing is carried out on the basis of the computed photographic film characteristics. Thus, image processing which takes variations in the photographic film characteristics into consideration can be carried out. Further, the standard exposure portion 80 reflects differences due to development such as developing conditions, and differences due to the passage of time such as aging over time, and the like. Because the photographic film characteristics are computed from the standard exposure portion 80, an image processing, from which effects such as differences due to developing and differences due to time are removed, can be carried out.

On the other hand, when it is determined in step 112 that photographic film characteristics are stored in the photographic film characteristics storing section 48, the routine skips to step 116, and in steps 116 and 118, various types of image processing are carried out and the series of processings is completed. In this way, a determination is made in step 112 as to whether the photographic film characteristics of the photographic film 68 which is undergoing image processing are stored in the photographic film characteristics storing section. Thus, if the photographic film characteristics are stored, the photographic film characteristics are not computed again, and image processing can be carried out on the basis of the data stored in the photographic film characteristics storing section 48. The processing time of the image processing can thereby be shortened.

Further, the photographic film characteristics which were prepared at the time of simultaneous printing are stored in the photographic film characteristics storing section 48. Thus, when reprinting is carried out, image processing which is similar to that at the time of simultaneous printing can be carried out even if a photographic film 68 which is cut into pieces of various lengths is being processed. At this time, it is preferable that the photographic film ID is provided along the entire photographic film, such that the standard exposure portion 80 illustrated in FIG. 3C or 3D for example is provided for each of the images recorded on the photographic film.

The image data, on which image processing has been carried out as described above, is set to the laser printer section 18. On the basis of the image data, an image is formed on the photographic printing paper 62, and the respective processings of color forming developing, bleaching fixing, washing and drying are carried out at the processor section 20, and a print is outputted. Here, in the present embodiment, the determination as to whether image processing is appropriate or not is carried out while the operator is looking at the print. In a case in which it is determined that the image processing is not appropriate, the processing conditions of various types of image processing can be corrected by the operator operating the keyboard 16K, so that an optimal print can be obtained.

In the above-described embodiment, the standard exposure portion 80 is formed by stepwise exposure in which the exposure amount is varied. However, it is not necessary to carry out stepwise exposure, and it suffices to merely carry out exposure at a single predetermined amount of exposure. In this case, the photographic film characteristics and the correction data are stored in advance for each film type, and image processing is carried out by changing the photographic film characteristics and the correction data on the basis of the data of the standard exposure portion obtained by reading.

Further, in the above-described embodiment, the photographic film characteristics are prepared, and photographic film non-linearity correction tables, which are the conversion characteristics of the photographic film such as those illustrated in FIG. 5, are prepared from the photographic film characteristics. However, the photographic film non-linearity correction tables can be prepared directly without preparing the photographic film characteristics. In this case, in the flowchart in FIG. 7, if the photographic film non-linearity correction tables are stored together with the photographic film ID in the photographic film characteristics storing section 48 in step 114, at the time of reprinting, in the same way as storing the photographic film characteristics, image processing which is similar to that at the time of initial printing can be carried out. Further, in this way, processing for preparing the photographic film non-linearity correction tables from the photographic film characteristics can be omitted, and the processing time can be shortened even more. Further, even if the read data obtained by the linear CCD scanner 14 reading the standard exposure portion 80 is stored, a non-linearity correction table of the photographic film can be prepared from the read data, and thus, the same type of image processing can be carried out.

Further, in the above-described embodiment, the photographic film ID is stored. However, even if image characteristic data expressing a characteristic of the image (e.g., density histogram data of the image recorded on the photographic film, rough data or compressed image data of a predetermined format (such as JPEG), or the like) is stored in place of the photographic film ID, by checking the image characteristic data, a non-linearity correction table of the photographic film can be read as the processing condition for image processing.

Next, a modified example of the present embodiment will be described. In the above-described embodiment, the non-linearity correction tables of the photographic film, which serve as the processing conditions of the image processing, are stored in the photographic film characteristics storing section 48 together with the photographic film ID. However, in this modified example, there is no need for the photographic film characteristics storing section 48.

Figure 3A:
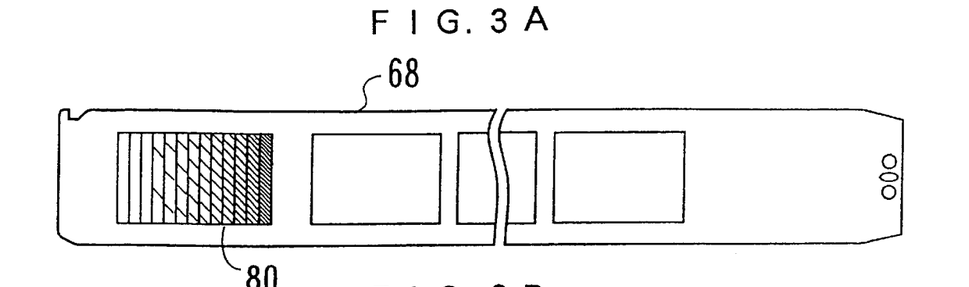
FIGS. 3A through 3D are views illustrating standard exposed portions which are exposed by a standard light source.
Figure 3B:
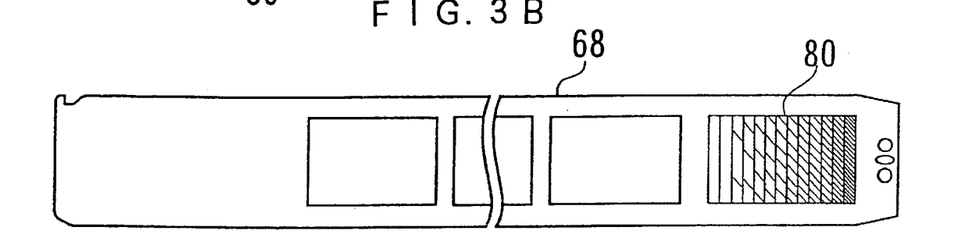
Figure 3C:
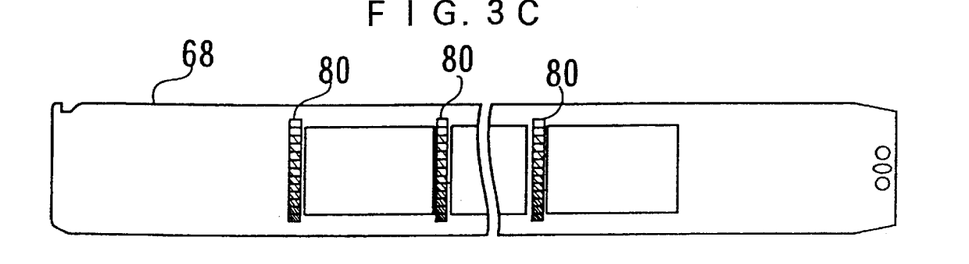
Figure 3D:
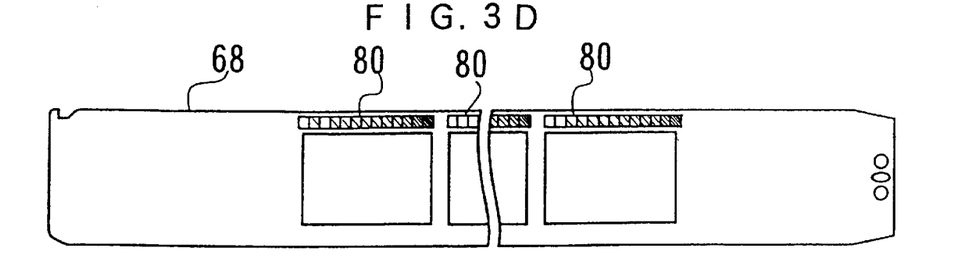

The standard exposure portions 80 are provided along the entire photographic film per image recorded on the photographic film 68, as illustrated in FIGS. 3C and 3D. In this way, the photographic film characteristics storing section 48 can be omitted. Namely, at the time that image processing is carried out, the standard exposure portion 80 provided per image recorded on the photographic film 68 is read by the linear CCD scanner 14, and the non-linear correction tables of the photographic film 68 are prepared, in the same way as described above, from the read image data obtained by reading. In this way, the same type of image processing can be carried out. Further, even if the photographic film 68 is cut into predetermined pieces, the standard exposure portion 80 is provided for each of the images along the entire photographic film 68. Thus, by reading the standard exposure portions 80 and carrying out processing as described above, image processing, from which effects such as differences in developing and differences over time are removed, can be carried out. Further, when reprinting is carried out as well, the same type of image processing can be carried out as in the case of simultaneous printing, by carrying out image processing as described above on the basis of the standard exposure portions 80 provided for the respective images.

Further, in the above-described embodiment, the photographic film characteristics are prepared on the basis of the density data in accordance with the exposure level obtained by the linear CCD scanner 14 reading the standard exposure portions 80. Image processing is carried out in accordance with the photographic film characteristics. However, graininess may be computed on the basis of the density data corresponding to the exposure level. By computing the graininess, processing conditions for graininess suppressing processing, hypersharpness processing and the like carried out at the image processing section 16 can be computed. Graininess can be computed, for example, by using a graininess computation method using RMS, and can be computed by $\sigma^2 = \Sigma(D_i - D_{mean})^2/(N-1)$, wherein $\sigma$ is the standard deviation for evaluating RMS graininess, $D_i$ is the pixel value of the ith pixel, $D_{mean}$ is the average pixel value of a line, and N is the number of pixels in one line.

The present invention is not limited to being applied to the preparation of prints as described above, and is also applicable to cases such as displaying images on a display means such as a display, or storing image data in an information storing medium such as a CD-R.

As described above, in accordance with the present invention, an image processing method and image processing device are provided which can always carry out optimal image processing without being affected by differences due to developing or differences due to the passage of time.

What is claimed is:

1. An image processing method comprising the steps of:
   exposing a predetermined region of a photographic photosensitive material at a predetermined exposure amount;
   reading the predetermined region of the photographic photosensitive material after the photographic photosensitive material has been developed;
   on the basis of read data obtained by the step of reading, determining a processing condition for image processing for converting, in accordance with a characteristic of the photographic photosensitive material, image data obtained by reading an image recorded in an image recording region of the photographic photosensitive material; and
   storing the determined processing condition together with a photographic photosensitive material ID which is applied to the photographic photosensitive material.

2. An image processing method according to claim 1, wherein when image processing is to be carried out on the image data, a determination is made as to whether a photographic photosensitive material ID of a corresponding photographic photosensitive material is stored, and if the photographic photosensitive material ID is stored, image processing is carried out on the basis of a processing condition of the image processing stored together with the photographic photosensitive material ID.

3. An image processing method according to claim 1, wherein when the photographic photosensitive material is manufactured, or during a time when the photographic photosensitive material is loaded in a photographing device, or at a time when an image recorded on the photographic photosensitive material is developed, the photographic photosensitive material ID is applied to the entire photographic photosensitive material per image recorded on the photographic photosensitive material.

4. An image processing method according to claim 1, further comprising a correction means for correcting the determined processing condition, and storing the corrected processing condition.

5. An image processing method according to claim 1, wherein the read data is stored in place of the processing condition.

6. An image processing method according to claim 1, wherein the predetermined region is at least one of a leading end portion, a trailing end portion, an outer edge portion, or a space portion between image recording regions, of the photographic photosensitive material.

7. An image processing method according to claim 1, wherein the step of exposing at a predetermined exposure amount is carried out at the time that the photographic photosensitive material is being developed by a developing apparatus.

8. An image processing method according to claim 1, wherein the step of exposing at a predetermined exposure amount is carried out at the time of manufacturing the photographic photosensitive material.

9. An image processing method according to claim 1, wherein the step of exposing at the predetermined exposure amount is carried out while the photographic photosensitive material is set in a photographing camera which records an image.

10. An image processing method according to claim 1, wherein the step of exposing at the predetermined exposure amount is carried out plural times at respectively different exposure amounts.

11. An image processing method according to claim 1, wherein the exposure at the predetermined exposure amount is gray exposure, red single color exposure, green single color exposure, or blue single color exposure.

12. An image processing method according to claim 1, wherein the read data is one of data representing gray gradation and data representing graininess.

13. An image processing method according to claim 1, wherein the image processing includes at least one of gray gradation balance correction processing, processing for correcting non-linearity of the photographic photosensitive material, graininess suppressing processing, and sharpness processing.

* * * * *